March 14, 1933.    A. L. FORSTER    1,901,743
MANUFACTURE OF WIRED GLASS
Filed Oct. 23, 1931
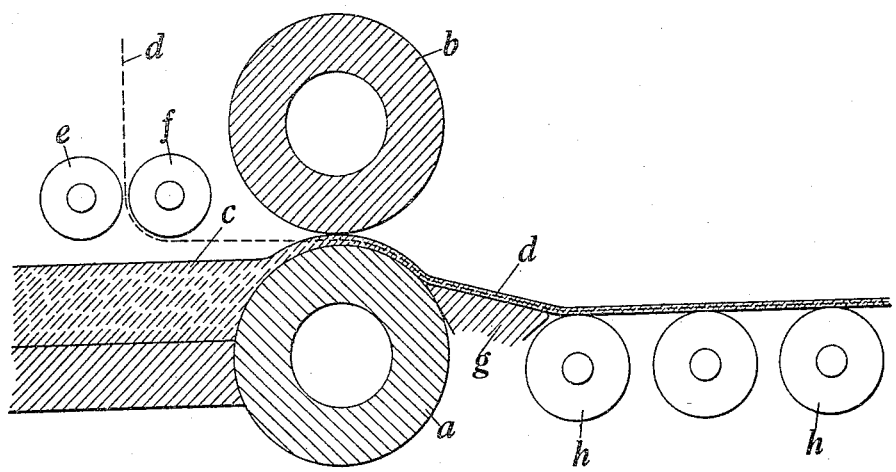
A. L. Forster
INVENTOR
By: Marks & Clerk
Atts.

Patented Mar. 14, 1933

1,901,743

UNITED STATES PATENT OFFICE

ALFRED LINDSAY FORSTER, OF GLASGOW, SCOTLAND, ASSIGNOR TO CHANCE BROTHERS AND CO. LIMITED, OF WEST SMETHWICK, ENGLAND

MANUFACTURE OF WIRED GLASS

Application filed October 23, 1931, Serial No. 570,739, and in Great Britain November 17, 1930.

This invention relates to the manufacture of wired glass, and has for its object to effect the incorporation of a wire mesh with the glass sheet in a more convenient and satisfactory manner than heretofore.

The invention comprises the arrangement at the side of the sheet forming rolls at which the glass is introduced, of a wire guide (which may be in the form of a roller or rollers) whereby the wire is caused to enter the glass before the glass reaches the forming rolls, the positioning of the wire in the glass being effected by appropriately adjusting either the tension of the wire, or its inclination, or otherwise.

The accompanying drawing illustrates diagrammatically one mode of carrying the invention into effect.

Referring to the drawing, I arrange a pair of sheet forming rolls, $a$, $b$, immediately adjacent to a pool or mass of glass $c$ which may be in direct communication with the melting furnace or which may otherwise be fed to the rolls. The lower roll $a$ forms one boundary of the pool and the upper roll is situated with its axis parallel to that of the lower roll. The two rolls are driven in any convenient manner so that their surface speeds are virtually the same. The pool $c$ is bounded on its two sides by metal or other plates situated approximately at right angles to the rolls and spaced apart at a distance corresponding to the width of the sheet to be produced. The upper surface of the glass in the pool is at a level approximating to that of the upper side of the pass between the forming rolls. This level may, however, be adjusted as required.

The wire $d$ ordinarily in the form of a mesh is supplied in long lengths or virtually continuously from any suitable magazine or coil situated above the forming rolls or in some other convenient situation so that in its passage to the glass it may be led to a guide situated on the pool side of the rolls. This guide may consist of a single roller around which the wire is passed, or it may consist of a pair of rollers, $e$, $f$, acting on opposite sides of the wire. The position of the guide is made adjustable relatively to the pass between the forming rolls so that either the tension of the portion of wire between the guide and the pass, or its inclination relatively to the free glass surface, or both can be suitably adjusted. The position of the guide is such that the wire is caused to enter the upper surface of the glass before the latter enters the pass. The angle between the wire and the surface of the glass at the position of entry is an acute one.

Due to the fact that the wire which has passed through the rolls has become firmly anchored in the glass a tension can be imposed on the wire, and in consequence of the fact that the glass sheet on the exit side of the rolls is at a lower level than that on the entry side, the extent to which the embedded wire approaches the surface of the lower roll can be varied by suitably varying the tension on the wire. The depth to which the wire becomes embedded can also be varied by adjusting the angle at which the wire enters the glass.

To protect the wire against the heat of the glass (and furnace if such be adjacent the pool or mass of glass) before it passes over or between the guide, a shield may advantageously be arranged in association with the wire, and both the shield and guide may be water-cooled.

After passing the forming rolls the wired sheet is supported on a short inclined surface $g$, and subsequently on a roller or series of rolers $h$, or other convenient means. If desired the sheet may be subjected to the action of finishing or other rolls. Either the forming rolls or the subsequent roll or rolls may be provided with ribbed or patterned surfaces.

In addition to the primary adjustments above described for determining the proper incorporation of the wire in the glass, other auxiliary conditions may be varied, such as the temperature-viscosity of the glass and the rate of rolling. Also the diameter of either or both of the forming rolls can be varied, or the cooling of such rolls.

The invention is not limited to the example above described, and subordinate details both of mechanism and procedure can be varied to suit different requirements.

Having thus described my invention, what I claim as new and desire to secure by Letters Patent is:—

In apparatus for use in the manufacture of wired glass, the combination of a pair of sheet forming rolls the lower one of which forms one side of a molten glass pool and has its upper surface above the level of the glass in the pool, and an adjustable wire guide situated above the pool at the entrance side of the rolls and adapted to engage the wire with the glass at an acute angle to the surface thereof immediately before the latter enters the rolls, the positioning of the wire in the glass being effected by adjusting the tension thereof.

In testimony whereof I have signed my name to this specification.

ALFRED LINDSAY FORSTER.